(12) United States Patent
Kowalczyk et al.

(10) Patent No.: US 8,213,807 B1
(45) Date of Patent: Jul. 3, 2012

(54) TUNABLE PHOTONIC CHANNELIZER

(75) Inventors: Anthony C. Kowalczyk, San Carlos, CA (US); Michael Enoch, Placitas, NM (US)

(73) Assignee: Lockheed Martin Corporation, Bethesda, MD (US)

( * ) Notice: Subject to any disclaimer, the term of this patent is extended or adjusted under 35 U.S.C. 154(b) by 755 days.

(21) Appl. No.: 12/175,397

(22) Filed: Jul. 17, 2008

(51) Int. Cl.
*H04B 10/04* (2006.01)

(52) U.S. Cl. ........ 398/192; 398/195; 398/196; 398/201; 398/140; 398/153; 398/115; 398/116

(58) Field of Classification Search ................. 398/115, 398/116, 140, 153, 165, 182, 192, 195, 196, 398/200, 201; 385/27; 359/128; 372/26
See application file for complete search history.

(56) References Cited

U.S. PATENT DOCUMENTS

| | | | |
|---|---|---|---|
| 5,699,177 A * | 12/1997 | Yamamoto | 398/58 |
| 6,654,561 B1 * | 11/2003 | Terahara et al. | 398/26 |
| 6,980,742 B1 * | 12/2005 | Liden et al. | 398/85 |
| 7,245,833 B1 * | 7/2007 | Volkening | 398/116 |
| 2002/0089720 A1 * | 7/2002 | Steinberg et al. | 359/128 |
| 2002/0131125 A1 * | 9/2002 | Myers et al. | 359/161 |
| 2002/0176457 A1 * | 11/2002 | DeCusatis et al. | 372/26 |
| 2002/0191279 A1 * | 12/2002 | DeCusatis et al. | 359/341.41 |
| 2003/0141438 A1 * | 7/2003 | Hammond et al. | 250/216 |
| 2003/0169959 A1 * | 9/2003 | Jacobowitz et al. | 385/16 |
| 2004/0161242 A1 * | 8/2004 | Xu | 398/149 |
| 2004/0234273 A1 * | 11/2004 | Sayyah et al. | 398/149 |
| 2006/0018660 A1 * | 1/2006 | Tian et al. | 398/85 |
| 2007/0217737 A1 * | 9/2007 | Gill et al. | 385/27 |
| 2008/0131141 A1 * | 6/2008 | Ranganath | 398/183 |

OTHER PUBLICATIONS

Tu et al: "Analog RF Performance of a CMOS .Optical Filter", 3rd IEEE International Conference on Group IV Photonics, Oct. 9, 2006, pp. 197-199.*

* cited by examiner

*Primary Examiner* — Li Liu
(74) *Attorney, Agent, or Firm* — McDermott Will & Emery LLP

(57) ABSTRACT

A tunable photonic channelizer includes an optical signal generator and an optical modulator. The optical modulator receives a first optical signal as an input from the optical signal generator and modulates the first optical signal to create a second optical signal. The tunable photonic channelizer includes an optical filter that is selectively tunable. The optical filter receives the second optical signal, filters the second optical signal, provides a third optical signal as a filtered version of the second optical signal. The tunable photonic channelizer includes a feedback loop between the optical filter and the optical signal generator to provide temperature and/or environmental feedback from the optical filter to the optical signal generator to enable the first optical signal to float in relation to the temperature and/or environmental feedback.

14 Claims, 6 Drawing Sheets

TUNABLE PHOTONIC CHANNELIZER

STATEMENT REGARDING FEDERALLY SPONSORED RESEARCH OR DEVELOPMENT

Not applicable.

FIELD

The present invention generally relates to optical signal processing and, in particular, relates to tunable photonic channelizers.

BACKGROUND

In today's information age the glut of information available overwhelms many information systems. For instance, wideband electro-optic modulators have been demonstrated that are capable of over a 60 GHz instantaneous bandwidth. Such large quantities of information makes finding specific data difficult. Filtering of radio frequency information in the optical domain has been performed using: Fabry Perot filters, ring/spherical waveguide resonators, time delay filters, and radio frequency filters.

Fabry Perot Filters cannot produce a narrow transmission filter function, but instead filter in the 10's of GHz and therefore cannot notch filter around a narrow bandpass. Fabry Perot filters possess small free spectral ranges that may lead to multiple filter bandpass groups in a particular radio frequency channel. Ring/spherical resonators require extreme fabrication precision that has not been demonstrated to date. In addition, ring/spherical resonators are fragile and thus challenging to package. Current state of the art ring/spherical resonators can filter RF signals in the high MHz to GHz regime. Also, ring/spherical resonator structures are built in planar constructions that possess different mode fields than do optical fibers, creating excessive optical insertion loss. Time delay filters require a means to accurately tune/adjust time of arrival or path length along a number of paths to tune filters, thus requiring banks of control and switching functions to create/control/modify time delays. To date high bit time delays are not available and low bit time delays are not size, weight, and/or power compatible. Traditional radio frequency filters are bulky and heavy and cannot be adjusted quickly.

SUMMARY

In accordance with an exemplary embodiment of the present invention, a tunable photonic channelizer is provided. As used herein the term channelizer is synonymous with filter. In certain exemplary embodiments the photonic channelizer may be tunable, and may include a feedback loop to provide temperature and/or environmental information to an optical signal generator. The optical signal generator may use that information to float an optical signal to provide a consistent output at the tunable photonic channelizer. As used herein, the term optical signal (or simply "signal") is synonymous with optical carrier (or simply "carrier") and/or a sideband of the carrier.

In accordance with an embodiment, a tunable photonic channelizer is provided that includes an optical signal generator and an optical modulator. The optical modulator is configured to receive a first optical signal as an input from the optical signal generator, to modulate the first optical signal, and to output a modulated version of the first optical signal as a second optical signal. The tunable photonic channelizer also includes an optical filter that is selectively tunable. The optical filter is configured to receive the second optical signal, to filter the second optical signal, and to output a filtered version of the second optical signal as a third optical signal. The tunable photonic channelizer also includes a feedback loop coupled between the optical filter and the optical signal generator. The feedback loop is configured to provide temperature and/or environmental feedback from the optical filter to the optical signal generator to enable the first optical signal to float in relation to the temperature and/or environmental feedback.

In accordance with an embodiment, a method for optical tunable filtering is provided. The method includes generating a first optical signal at an optical signal generator. The method further includes receiving the first optical signal as a first input of an optical modulator. The method further includes modulating the first optical signal at the optical modulator with information to produce a second optical signal. The method further includes receiving the second optical signal at an optical filter that is selectively tunable. The method further includes filtering the second optical signal at the optical filter to produce a third optical signal. The method further includes providing temperature and/or environmental feedback from the optical filter to the optical signal generator. The method further includes floating the first optical signal in relation to the temperature and/or environmental feedback.

Additional features of the invention will be set forth in the description below, and in part will be apparent from the description, or may be learned by practice of the invention. The advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF DRAWINGS

The invention both to its organization and manner of operation, may be further understood by reference to the drawings that include FIGS. 1 through 6, taken in connection with the following descriptions.

DETAILED DESCRIPTION

The following description of illustrative non-limiting embodiments of the invention discloses specific configurations and components. However, the embodiments are merely examples of the present invention, and thus, the specific features described below are merely used to describe such embodiments to provide an overall understanding of the present invention. One skilled in the art readily recognizes that the present invention is not limited to the specific embodiments described below. Furthermore, certain descriptions of various configurations and components of the present invention that are known to one skilled in the art are omitted for the sake of clarity and brevity. Further, while the term "embodiment" may be used to described certain aspects of the invention, the term "embodiment" should not be construed to mean that those aspects discussed apply merely to that embodiment, but that all aspects or some aspects of the disclosed invention may apply to all embodiments, or some embodiments.

Figure 1:
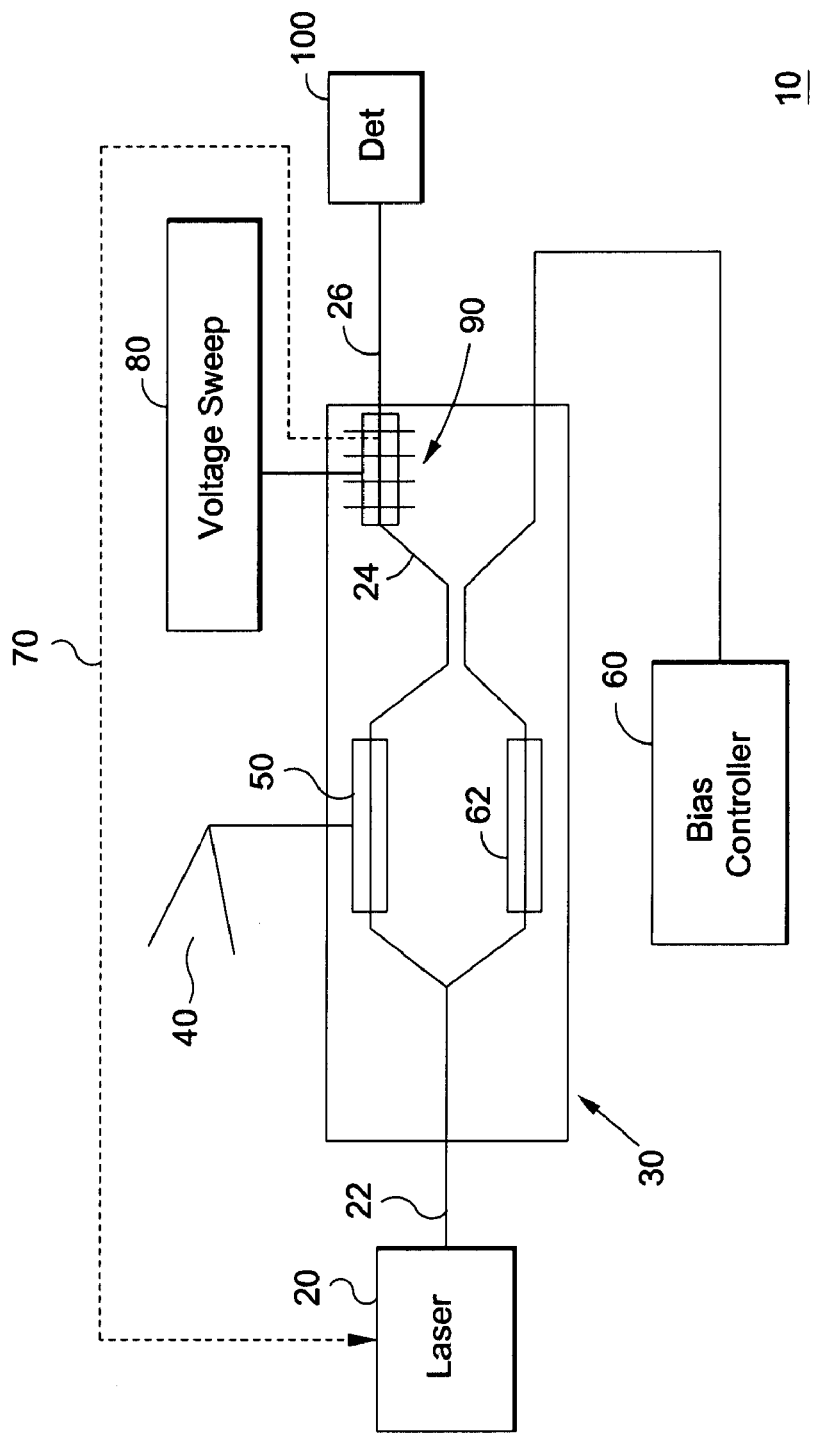
FIG. 1 is a schematic illustration of an exemplary embodiment of the invention.

FIG. 1 illustrates a schematic of an exemplary embodiment of the present invention. As shown in the figure, an electro-optical tunable photonic channelizer 10 may include an optical signal generator 20, a bias control module 60, an antenna 40, a feedback loop 70, a voltage sweep module 80, a detector 100, and a modulator module 30. The modulator module 30 comprises a optical modulator 50 and a optical filter 90.

The optical signal generator 20 may be a Helium-Neon laser or another type of optical signal generator as would be known to one of skill in the art. The optical signal generator 20 provides a first optical signal 22 to modulator module 30. Bias control module 60 provides bias control to the modulator module 30 at bias junction 62. Modulator module 30 may be an integrated optical chip, and may be made from material that is typical for forming optical waveguides, such as Lithium Niobate (LiNbO$_3$) or Lithium Tantalate (LiTaO$_3$) crystal.

Within modulator module 30 optical modulator 50 is configured to receive the first optical signal 22 and radio frequency information from antenna 40, and to modulate the first optical signal 22 with the information received from antenna 40 to create a modulated second optical signal 24. Optical modulator 50 may be a Mach-Zehnder modulator, or another modulator known in the art.

The bandwidth of second optical signal 24 can be quite large, including a size well into the tens of Gigahertz. In one exemplary embodiment of the present invention, the bandwidth of second optical signal 24 is approximately 60 GHz.

Second optical signal 24 is provided as an input to optical filter 90. Optical filter 90 may be a phase-shifted Fiber Bragg grating or another type of reflector or filter that would be known to one of skill in the art, including other types of distributed Bragg reflectors, dielectric mirrors, or known optical filters. Second optical signal 24 possesses a large bandwidth (as previously discussed) and is provided to the input of optical filter 90. In an exemplary embodiment of the present invention, optical filter 90 is an electrically tunable fiber Bragg grating (FBG) that receives a voltage sweep signal between zero and 15 volts from voltage sweep module 80. The 15 volt sweep voltage may be used to cause optical filter 90 to provide third optical signal 26 as an output that may be anywhere from 10 MHz to 5 GHz in bandpass.

Optical filters, including fiber Bragg gratings, may be somewhat sensitive to both temperature and environmental conditions. Temperature changes can induce a corresponding change in the bandwidth that is derived from the filtering aspect of many filters and/or in the frequency output of same. Changes in barometric pressure may also induce a corresponding change in the output of the filter. For instance, in cold weather and/or when atmospheric pressure is heavy, the LiNbO$_3$ material of modulator module 30 may contract and/or expand. Due to the change in physical geometry, the optical filter 90 will have a slightly different physical geometry than when the optical filter 90 is faced with a different temperature and/or under different barometric pressure. The change in physical dimension may induce a frequency shift in third optical signal 26. To address this issue, an exemplary embodiment of the present invention comprises feedback loop 70.

Feedback loop 70 provides feedback information on temperature and/or environmental changes (as sensed at optical filter 90) to optical signal generator 20. In various exemplary embodiments the feedback signal may be electrical or optical. Optical signal generator 20 is configured to receive the feedback signal from feedback loop 70, and in response to the feedback signal, optical signal generator 20 "floats" the frequency of the first optical signal 22. For example, the first optical signal 22 comprises a carrier frequency, and in response to the temperature and/or environmental changes sensed at optical filter 90, the optical signal generator 20 may adjust the frequency of the first optical signal 22 to make up for losses and/or gains in frequency sensed at optical filter 90. Optical filter 90 may comprise a temperature sensor and/or a piezo-electrical sensor to generate the feedback signal of feedback loop 70. Those of skill in the art would understand that measuring ambient temperature with an optical fiber, an optical waveguide, and/or an optical fiber grating is attainable by accounting for minute shifts in optical wavelengths at the output of the device being used to measure temperature. The degree of optical wavelength shift corresponds to a degree of temperature change and/or a change in barometric pressure, for example. Feedback loop 70 provides the optical signal generator 20 with information corresponding to the temperature and/or environmental changes, and optical signal generator 20 then adjusts (or "floats") the frequency of first optical signal 22 to make up for the change in frequency noted at optical filter 90.

Third optical signal 26 is then sent to a detector 100 where information previously placed on the first optical signal (to create the second optical signal) may be evaluated or otherwise recovered. One of skill in the art would understand that the detector 100 may be another output device such as a digital signal processor, a receiver, a display, or a handset.

In an exemplary embodiment of the present invention, optical filter 90 may be tunable. Those of skill in the art would understand that based on alterations in the voltage supplied to optical filter 90, such as the voltage provided by voltage sweep module 80, the output of optical filter 90 may change bandwidth and/or frequency ranges from one bandwidth to another bandwidth.

Figure 2:
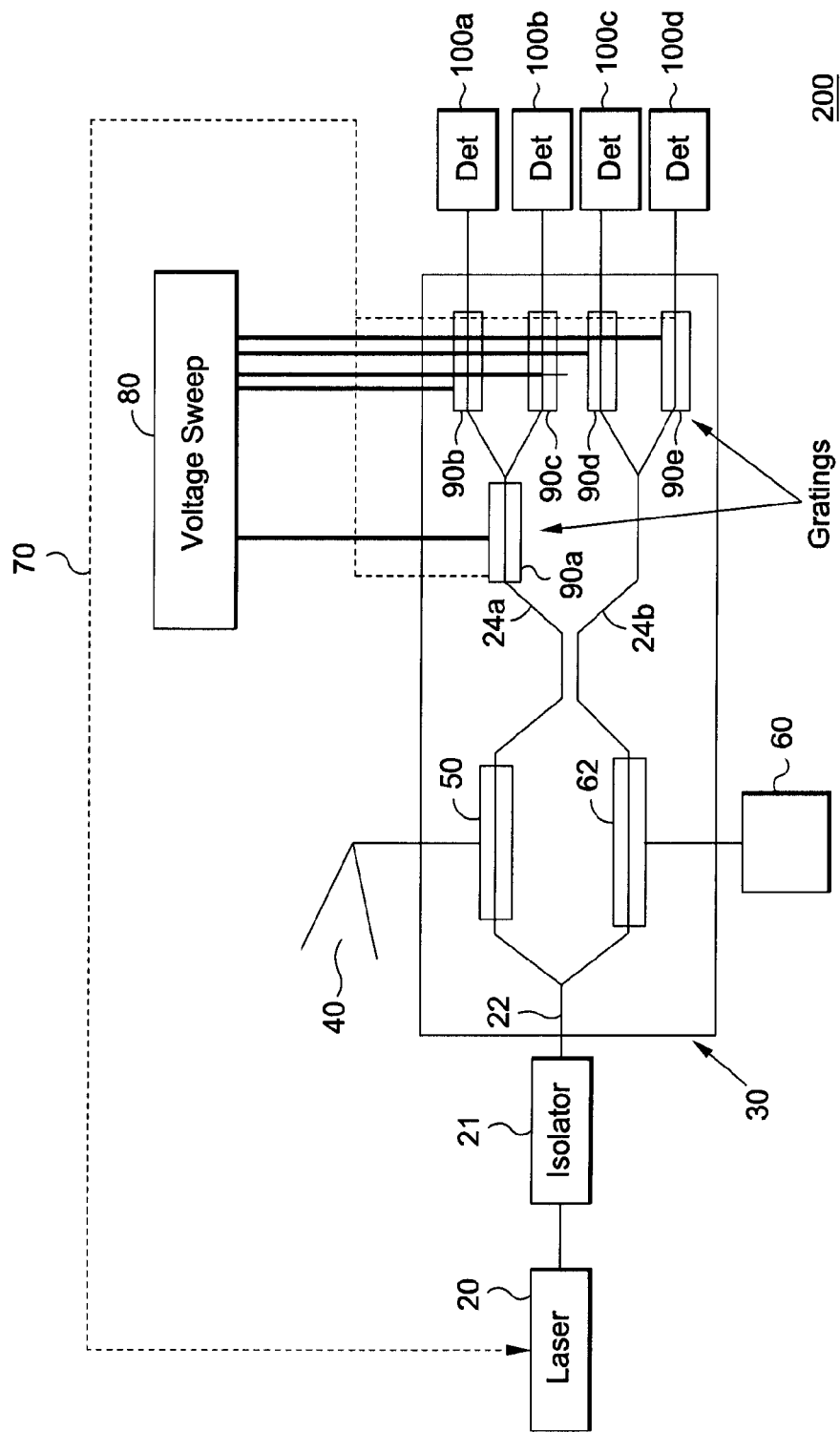
FIG. 2 is a schematic illustration of an exemplary embodiment of the invention.

FIG. 2 is a schematic illustration of an exemplary embodiment of the invention including tunable photonic channelizer 200. Like components in reference to FIG. 1 are labeled with identical element numbers for ease of understanding. Unnecessary, reiterative discussion of like components is not repeated for the sake of brevity.

As shown in the FIG. 2, isolator 21 receives the optical signal generated by optical signal generator 20. Isolator 21 acts as a one-way optical pass where optical signals are allowed to travel from optical signal generator 20, through isolator 21, and into modulator module 30 but not back into isolator 21. The electrical equivalent of isolator 21 is a diode, or a one-way component. On entering the modulator module 30, optical signal 22 is split into two paths: one path to optical modulator 50, and one path to a bias control junction 62 where unit bias control module 60 performs bias control on the optical signal. One of skill in the art would understand that bias control unit 60 may provide for user-selectable bias control, or that it may provide for bias control defined by automatic, pre-determined parameters.

Radio frequency information is received at antenna 40 and modulated onto the optical signal. Optical modulator 50 outputs a signal 24a that is fed to optical filter 90a. Optical filter 90a may be of the type discussed above in relation to optical filter 90. The output of optical filter 90a is provided to optical filters 90b and 90c. Signal 24b, after being controlled for bias, is sent to optical filters 90d and 90e. Bias control unit 60, voltage sweep module 80, feedback loop 70, optical filters 90a, 90b, 90c, 90d, and 90e, and detectors 100a, 100b, 100c, and 100d may all be of types discussed above in relation to like elements/components.

Feedback loop 70 shown in FIG. 2 may provide a single feedback loop signal or may provide multiple feedback signals (generally up to a number equal to the number of optical filters 90a, 90b, 90c, 90d, 90e, . . . 90x) to optical signal generator 20.

FIG. 2 illustrates that in exemplary embodiments of the present invention, there may be multiple optical filters 90a, 90b, 90c, 90d, and 90e, and the optical filters 90a, 90b, 90c, 90d, and 90e may be configured in series and/or in parallel. Arranging the filters in series and/or in parallel may be useful for performing a bandpass of a certain frequency range where each of the filters is responsible for smaller frequency ranges than the overall bandpass. Additionally, different optical filters such as 90d and 90e may be used as reference check filters where each provides an input to a comparator to better estimate a precise filtered output. Each optical filter 90a, 90b, 90c, 90d, and 90e can be individually and/or electrically tuned and/or adjusted for various frequency outputs. Each optical filter 90a, 90b, 90c, 90d, and 90e may have either a unique optical transmission/filter functions, similar optical transmission/filter functions, or variations of unique and similar optical transmission/filter functions.

Figure 3:
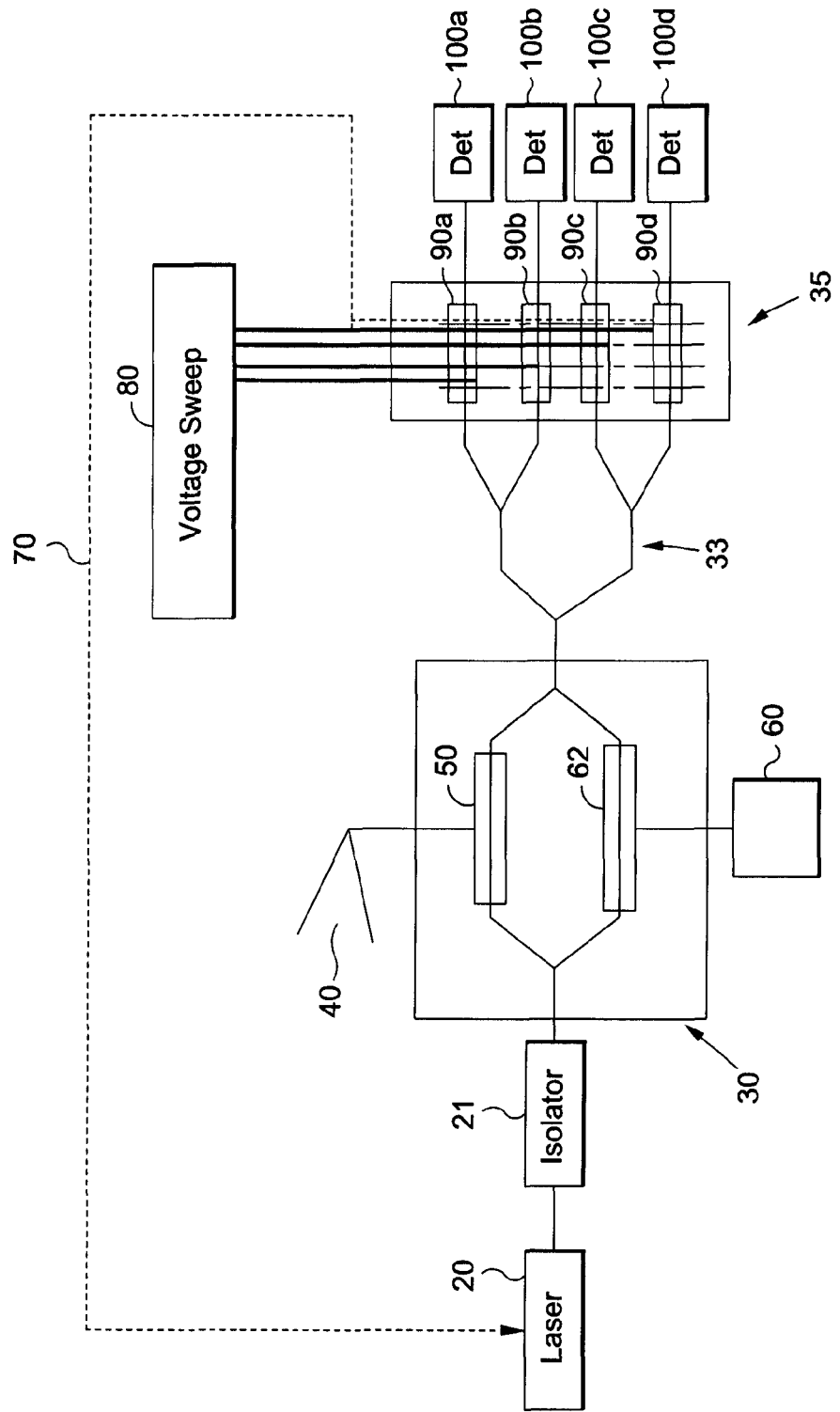
FIG. 3 is a schematic illustration of an exemplary embodiment of the invention.

FIG. 3 is a schematic illustration of an exemplary embodiment of the invention, including tunable photonic channelizer 300. Like components in reference to FIGS. 1 and 2 are labeled with identical element numbers for ease of understanding. Unnecessary, reiterative discussion of like components is not repeated for the sake of brevity. As shown in the figure and in comparison to FIGS. 1 and 2, modulator module 30 is now separate from filter module 35.

Optical modulator 50 modulates information on an optical signal provided by optical signal generator 20. The optical signal is allowed to pass isolator 21 to enter modulator module 30 as an input to both optical modulator 50 and for bias control as managed by bias control unit 60 at bias control junction 62. The output of modulator module 30 is provided to a light guiding medium 33, such as an optical fiber, to travel from modulator module 30 to filter module 35. The modulated light signal provided by modulation module 30 contains information from the radio frequency signal received at antenna 40. At optical filter bank 90a, 90b, 90c, and 90d, the modulated optical signal is filtered according to need. As discussed above, optical filters 90a, 90b, 90c, and 90d may be selectively, individually, and/or electrically tunable for precise frequencies and bandpass. Feedback loop 70 may comprise an individual feedback signal or may comprise multiple feedback signals to optical signal generator 20. Optical signal generator 20 may utilize at least one of the feedback signals to "float" the frequency of the generated optical signal as discussed above in relation to FIGS. 1 and 2.

Figure 4:
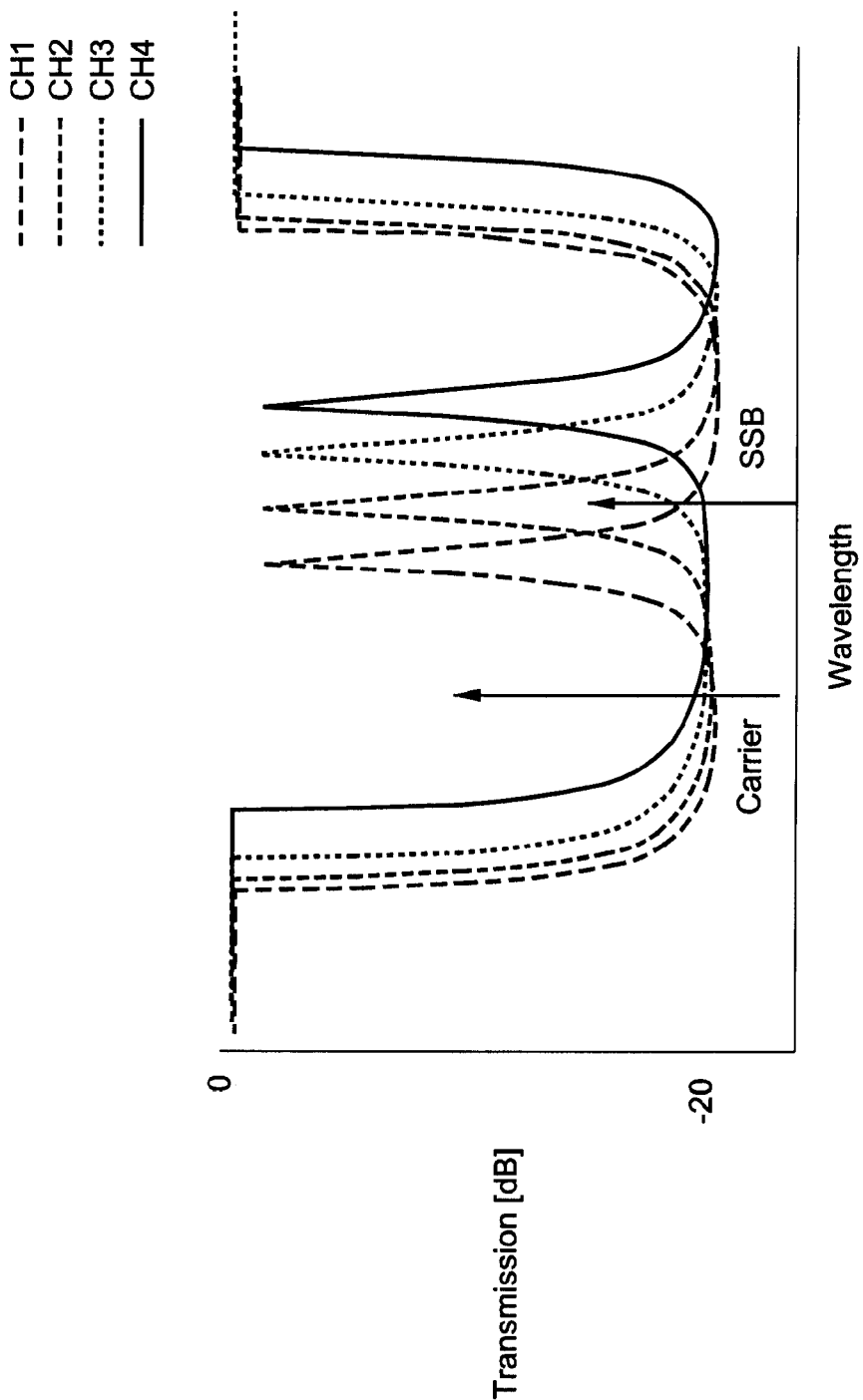
FIG. 4 is a graph showing signal processing results derived from an exemplary embodiment of the invention.

FIG. 4 is a graph of filter results achieved using an exemplary embodiment of the present invention, including either passive or active filters. Passive filters may be used where selectively and individually tunable filters are not desired, such as for application with known frequencies that do not require variation in output. These may also be referred to as "dumb" detector applications. Fiber Bragg filters may use a notch filter for undesired frequencies, and this filtering aspect may be done immediately around a carrier signal thereby allowing processing of the desired frequencies. As shown in FIG. 4, the carrier signal has had unwanted frequencies notch filtered on each side, thereby allowing for processing of the carrier signal.

Figure 5:
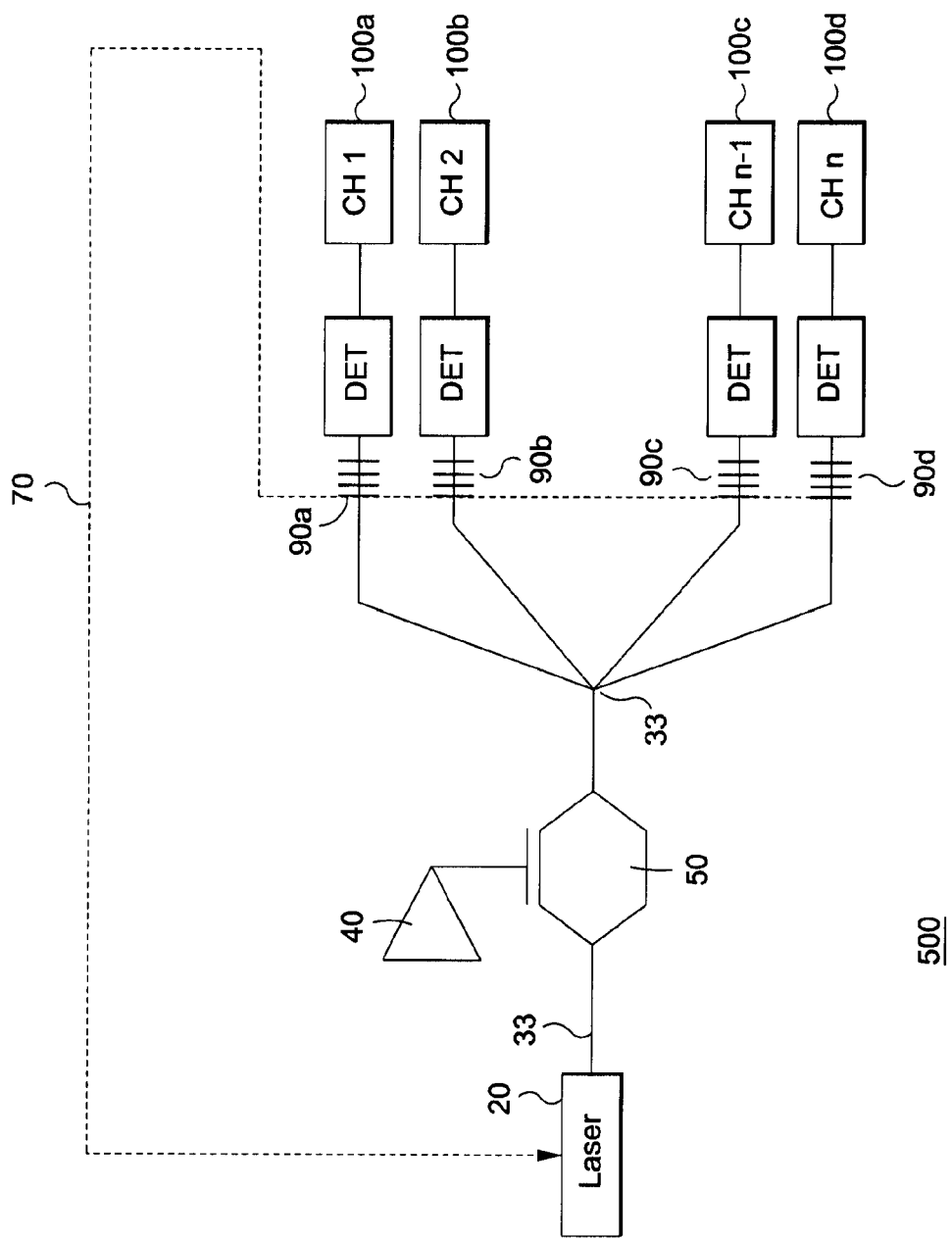
FIG. 5 is a schematic illustration of an exemplary embodiment of the invention.

FIG. 5 is a schematic illustration of an exemplary embodiment of the invention, including tunable photonic channelizer 500. Like components in reference to FIGS. 1, 2, and 3 are labeled with identical element numbers for ease of understanding. Unnecessary, reiterative discussion of like components is not repeated for the sake of brevity. As shown in the figure, each of optical signal generator 20, optical modulator 50 and antenna 40, optical filters 90a, 90b, 90c, and 90d, feedback loop 70, and detectors/channels 100a, 100b, 100c, and 100d are separate components linked by sections of light guide medium 33. Light guide medium 33 may comprise fiber optics line. Feedback loop 70 may comprise a single feedback signal or multiple feedback signals. Optical filters 90a, 90b, 90c, and 90d filter the optical signal modulated by optical modulator 50 according to need. As discussed above, optical filters 90a, 90b, 90c, and 90d may be selectively, individually, and/or electrically tunable for precise frequencies and bandpass. Optical signal generator 20 may utilize at least one of the feedback signals to "float" the frequency of the generated optical signal as discussed above in relation to FIGS. 1, 2 and 3.

Figure 6:
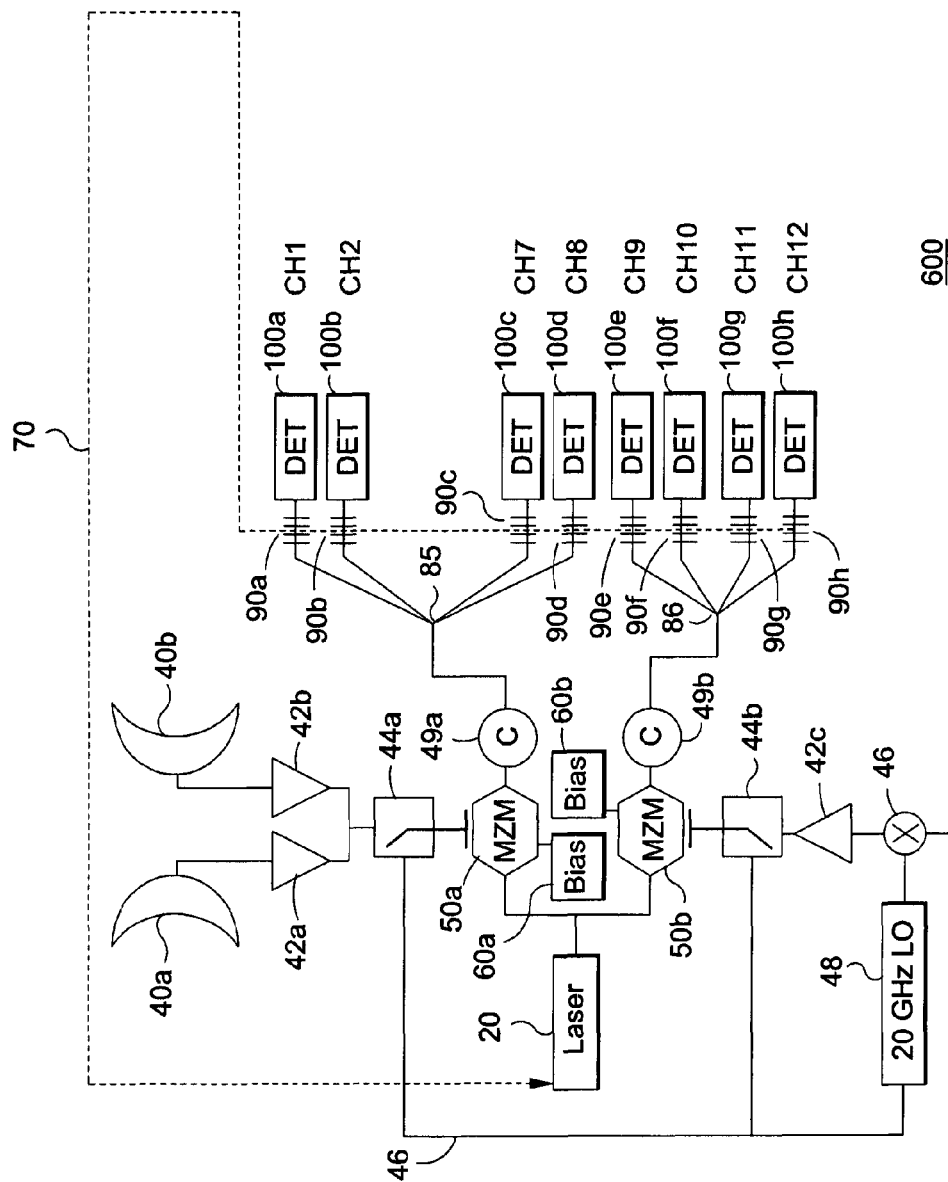
FIG. 6 is a schematic illustration of an exemplary embodiment of the invention.

FIG. 6 is a schematic illustration of an exemplary embodiment of the invention, including tunable photonic channelizer system 600. Like components in reference to FIGS. 1, 2, 3, and 5 are labeled with identical element numbers for ease of understanding. Unnecessary, reiterative discussion of like components is not repeated for the sake of brevity. As shown in the figure, optical signal generator 20 produces an optical signal that is then provided to each of modulators 50a and 50b. Modulators 50a and 50b may be Mach-Zehnder modulators, or other known types of modulators as one of skill in the art would understand.

In an exemplary embodiment, antenna 40a is configured to receive a bandwidth range of 1-20 GHz, antenna 40b is configured to receive a bandwidth range of 20-40 GHz, and antenna 40c is configured to receive a bandwidth range of 40-55 GHz. Antenna 40a provides a radio frequency signal including modulated information in the bandwidth of 1-20 GHz to amplifier 42a. Antenna 40b provides a radio frequency signal including modulated information in the bandwidth of 20-40 GHz to amplifier 42b. Antenna 40c provides a radio frequency signal including modulated information in the bandwidth of 40-55 GHz to junction 46.

The 1-20 GHz signal is amplified at amplifier 42a and is then provided to switch 44a. The 20-40 GHz signal is amplified at amplifier 42b and is then provided to switch 44a. Switch 44a may be configured to automatically switch, or to switch based on a user input, between the signals provided by amplifiers 42a or 42b. Switch 44a provides modulated radio frequency information from either of the frequency bandwidths of 1-20 GH or 20-40 GHz to at least one of signal path 46 and/or modulator 50a.

Signal path 46 provides modulated radio frequency information from either of the frequency bandwidths of 1-20 GHz or 20-40 GHz to switch 44b and to mixer 48. Mixer 48 down-converts its input by an amount equal to an internal oscillator (not shown) and that down-converted signal is then allowed to pass to junction 46. The purpose for down-converting is to provide a downstream signal to a fiber Bragg filter that hits the filter's 'sweet spot,' or that range of bandpass that is optimal for a downstream filter. One of skill in the art would recognize that different down-converters or up-converters could be implemented to match the particular filtering characteristics of a desired filter.

Junction 46 may be provided with both the 40-55 GHz signal received from antenna 40c and the 1-20 GHz signal received from lowpass filter 48. Because the two signals have a 20 GHz notch between them, the two signals have a low likelihood of causing interference with one another. Amplifier 42c then amplifies the signals provided from junction 46, whether that be the low pass 1-20 GHz signal or the 40-55 GHz signal, and the amplified radio frequency signal(s) are then provided to switch 44b.

Switch 44b may be configured to switch between signal path 46 and amplifier 42c. If switched to signal path 46, switch 44b may receive either of the 1-20 GHz and the 20-40 GHz signals. If switched to amplifier 42c, switch 44b may receive either of the 1-20 GHz and the 40-55 GHz signals. Switch 44b may be configured to automatically switch, or to switch based on a user input, between the signals provided by signal path 46 or amplifier 42c. Switch 44v then provides modulated radio frequency information from any of the frequency bandwidths of 1-20 GHz, 20-40 GHz, and/or 40-55 GHz to modulator 50b.

Modulators 50a and 50b receive radio frequency signals (of the above-noted bandwidths) with information. The information in the radio frequency signals is modulated to the optical signal provided by optical signal generator 20. Each of modulators 50a and 50b is provided with a bias control unit 60a and 60b, respectively, that provide bias control as one of skill in the art would understand.

In an exemplary embodiment of the present invention, modulator 50a provides a modulated optical signal containing the information taken from the radio frequency signal(s) to circulator 49a. Circulator 49a may alternatively be an isolator or another component. The modulated optical signal from circulator 49a is provided to splitter junction 85. Splitter junction 85 may be a 1×4 splitter as shown, or may be another splitter such as a 1×8 splitter, as desired.

The modulated optical signal is then provided from splitter junction 85 to a filter bank comprising optical filters 90a, 90b, 90c, and 90d. Optical filter 90a provides a filtered output to detector 100a. The filtered signal may provide between a 10 MHz and 5 GHz bandpass, for example. One of skill in the art would understand that practically any range of filtered bandpass could be filtered by optical filter 90a, or by other optical filters 90b, 90c, and/or 90d. As discussed above, each of optical filters 90a, 90b, 90c, and 90d may be selectively, electrically and/or individually tunable using a voltage sweep input, such as shown by the voltage sweep provided by voltage sweep module 80 shown in FIGS. 1 and 2. Each of optical filters 90a, 90b, 90c, and 90d may provide a feedback signal to feedback loop 70 as discussed above in relation to FIGS. 2, 3, and 5. Feedback loop 70 may thus comprise a single feedback signal or multiple feedback signals. Optical signal generator 20 may utilize at least one of the feedback signals to "float" the frequency of the generated optical signal to correct for variations in frequency detected at any of optical filters 90a, 90b, 90c, and/or 90d, as discussed above in relation to FIGS. 1, 2, 3 and 5.

Each of optical filters 90a, 90b, 90c, and 90d filter the optical signal modulated by modulator 50a according to need. Each of optical filters 90a, 90b, 90c, and 90d may be selectively, individually, and/or electrically tunable for precise frequencies and bandpass.

As further shown in FIG. 6, detectors 100a, 100b, 100c, and 100d may each respectively detect information that has been modulated to the optical signal modulated by modulator 50a after filtering by a respective optical filter 90a, 90b, 90c, and/or 90d. The detected output may then be labeled according to need, such as CH1 for the output of detector 100a, CH2 for the output of detector 100b, CH7 for the output of detector 100c, CH8 for the output of detector 100d, etc. . . .

Modulator 50b provides a modulated optical signal containing the information taken from the radio frequency signal (s) to circulator 49b. Circulator 49b may alternatively be an isolator or another component. The modulated optical signal from circulator 49b is provided to splitter junction 86. Splitter junction 86 may be a 1×4 splitter as shown, or may be another splitter such as a 1×8 splitter, as desired.

The modulated optical signal is then provided from splitter junction 86 to a filter bank comprising optical filters 90e, 90f, 90g, and 90h. Optical filter 90e provides a filtered output to detector 100e. The filtered signal may provide between a 10 MHz and 5 GHz bandpass, for example. One of skill in the art would understand that practically any range of filtered bandpass could be filtered by optical filter 90e, or by other optical filters 90f, 90g, and/or 90h. As discussed above, each of optical filters 90e, 90f, 90g, and 90h may be selectively, electrically and/or individually tunable using a voltage sweep input, such as shown by the voltage sweep provided by voltage sweep module 80 shown in FIGS. 1 and 2. Each of optical filters 90e, 90f, 90g, and 90h may provide a feedback signal to feedback loop 70 as discussed above in relation to FIGS. 2, 3, and 5. Feedback loop 70 may thus comprise a single feedback signal or multiple feedback signals. Optical signal generator 20 may utilize at least one of the feedback signals to "float" the frequency of the generated optical signal to correct for variations in frequency detected at any of optical filters 90e, 90f, 90g, and/or 90h, as discussed above in relation to FIGS. 1, 2, 3 and 5.

Each of optical filters 90e, 90f, 90g, and 90h filter the optical signal modulated by modulator 50b according to need. Each of optical filters 90e, 90f, 90g, and 90h may be selectively, individually, and/or electrically tunable for precise frequencies and bandpass.

As further shown in FIG. 6, detectors 100e, 100f, 100g, and 100h may each respectively detect information that has been modulated to the optical signal modulated by modulator 50b after filtering by a respective optical filter 90e, 90f, 90g, and/or 90h. The detected output may then be labeled according to need, such as CH9 for the output of detector 100e, CH10 for the output of detector 100f, CH11 for the output of detector 100g, CH12 for the output of detector 100h, etc. . . .

Additional aspect of exemplary embodiments of the present invention include the following. The nonlinearity of the $LiNbO_3$ used for creating the modulator module 30 (and/or filter bank module 35 shown in FIG. 3) implies that the tuning coefficient approximates 0.75 V/GHz. Use of a single FBG for the filter 90 (FIG. 1) may continually sweep 0-15V to achieve an approximate 20 GHz bandwidth. Alternatively any number of FBGs (optical filter 90 through 90x) may each be individually tunable over ranges small than 20 GHz. Multiple phase-shifted fiber Bragg gratings (FBGs) may be fabricated into single chip, as one of skill in the art would understand. Optical filters 90 through 90x can operate in parallel or series and/or with multiple filters in a single tunable photonic channelizer device.

Optical filters 90 through 90x may be external to modulator module 30. Passive 1×N splitter may be used to provide optical signals into each fiber Bragg grating. Optical filters 90 through 90x may operate passively (V=0) or with electrically tunable gratings. Any of the FBGs may possess a notch filter and may include a stop band. "Dumb" detectors may be used for applications merely requiring sense and not selective tuning.

Passive filtering may be done using optical fibers. Using optical fibers generally lowers power consumption and reduces the size of the tunable photonic channelizer. Passive component simplicity improves size, weight, and power.

An exemplary embodiment of the present invention is capable of detection coverage from the low Hertz to many tens of GHz, and may operate as a notch filter in the low MHz bandwidths, for example a 1-10 Mhz bandwidth. Each individual optical filter 90 through 90x may provide a different information channel with variable width and/or with varied notch filtering.

An exemplary embodiment of the present invention provides a means of processing (filtering) RF information in the optical domain by tuning an electric field controllable phase-shifted fiber Bragg grating and/or the use of a set of phase-shifted fiber Bragg gratings on the output port of an RF modulator. RF information may be placed onto an optical signal by means of an EO (electro-optic) modulator (e.g., a Mach Zehnder modulator). An exemplary embodiment of the present invention integrates a phase-shifted fiber Bragg directly into a $LiNbO_3$ modulator. A phase-shifted fiber Bragg grating may be used to filter in an exemplary embodiment to allow for a narrow transmission bandpass (e.g., 10 Mhz to 5 Ghz). The processing may include wide notch filtering on the order of tens of GHz. Such a stop/pass filter arrangement is ideal for processing modulated sidebands on an optical signal while also suppressing the signal. Fabricating fiber Bragg gratings into $LiNBO_3$ allows for electrical tuning using the electro-optical constriction effect. Alternatively, fiber Bragg gratings can be operated passively if different fabrication parameters are used to fabricate each grating. Fabricating fiber Bragg gratings into $LiNbO_3$ allows for electrical tuning using the electro-optical effect.

For applications that require MHz passband widths, sub-micron gratings are required. In this case, standard domain inversion techniques used to write gratings into $LiNbO_3$ can not be employed. Alternatively, one can deposit a 0.1-0.3 um amorphous glass layer (with a refractive index between 1.4-1.8) atop the $LiNbO_3$ wafer and then selectively expose areas with ultraviolet light in a photolithography process to create refractive index modulated regions (i.e., gratings) in glass above the $LiNbO_3$ waveguide. Those skilled in the art of waveguide creation will realize that index modulation of glass results in a modulation of the effective index of the $LiNbO_3$ waveguide, thus producing the desired sub-micron grating without using domain inversion.

Exemplary embodiments of the present invention may include a stand-alone chip with an array of phase-shifted fiber Bragg gratings, such as modulator module 30 shown in FIG. 2. A benefit of electrically tuning gratings is simplification of manufacturing tolerances. If gratings are fabricated with slight variations in desired locations, then a voltage can be applied to move the grating to a desired location. FIG. 6 illustrates an exemplary embodiment of the present invention employing an array of phase-shifted fiber Bragg gratings to channel RF information over a 55 GHz bandwidth using individual 5 GHz channels. In this architecture each grating has a slightly offset bandpass so that it may sense/detect sideband information that falls within its transmission bandpass. Exemplary embodiments of the present invention may be optically based, meaning that the embodiments may process or filter information over a wide bandwidth without modifying existing systems' components, such as hardware and cable.

It is understood that any specific order or hierarchy or steps in the processes disclosed herein are merely exemplary illustrations and approaches. Based upon design preferences, it is understood that any specific order or hierarchy of steps in the process may be re-arranged. Some of the steps may be performed simultaneously.

The previous description is provided to enable persons of ordinary skill in the art to practice the various aspects described herein. Various modifications to these aspects will be readily apparent to those skilled in the art, and the general principles defined herein may be applied to other aspects. Thus, the claims are not intended to be limited to the aspects shown herein, but are to be accorded the full scope consistent with the claim language. Headings and subheadings, if any, are used for convenience only and do not limit the invention. All structural and functional equivalents to the elements of the various aspects described throughout the disclosure that are known or later come to be known to those of ordinary skill in the art are expressly incorporated herein by reference and are intended to be encompassed by the invention. Moreover, nothing disclosed herein is intended to be dedicated to the public regardless of whether such disclosure is explicitly recited in the above description.

As used herein, a reference to an element in the singular is not intended to mean "one and only one" unless specifically stated, but rather "one or more." The term "information" may include data taken from a radio frequency signal and may take various forms, for instance, audio, video, multimedia, instructions, commands, or other information. The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:
1. A tunable photonic channelizer, comprising:
an optical signal generator configured to provide a first optical signal having a frequency;
an optical modulator configured to receive the first optical signal from the optical signal generator and accept an input of radio frequency information, the modulator further configured to modulate the first optical signal with the accepted radio frequency information, and to output a modulated version of the first optical signal as a second optical signal, the modulator comprising a plurality of electrically tunable phase-shifted fiber Bragg gratings configured to receive the second optical signal, to filter the second optical with a bandwidth that is less than or equal to 10 MHz, and to output a filtered version of the second optical signal as a plurality of third optical signals, the modulator further configured to measure an ambient temperature at the fiber Bragg gratings and provide a feedback signal;
a plurality of detectors configured to respectively accept the plurality of third optical signals and recover the radio frequency information from the respective third signals; and
a feedback loop coupled between the modulator and the optical signal generator, the feedback loop configured to provide the feedback signal to the optical signal generator;

wherein the optical signal generator is further configured to float the frequency of the first optical signal in response to the feedback signal.

2. The tunable photonic channelizer of claim 1, further comprising a voltage sweep module configured to provide a voltage to the fiber Bragg gratings for selectively tuning the fiber Bragg gratings.

3. The tunable photonic channelizer of claim 1, further comprising an isolator disposed between the optical signal generator and the optical modulator and configured to allow the first optical signal to travel only from the optical signal generator to the optical modulator.

4. The tunable photonic channelizer of claim 1, further comprising an antenna configured to accept a radio frequency signal comprising the radio frequency information.

5. The tunable photonic channelizer of claim 1, further comprising an optical light guide configured to transmit the second optical signal from the optical signal modulator to the fiber Bragg gratings.

6. The tunable photonic channelizer of claim 1, wherein the fiber Bragg gratings are formed by depositing a layer of amorphous glass having a refractive index in the range of 1.4-1.8 and a thickness of 0.1-0.3 micrometer atop a $LiNbO_3$ wafer and then selectively exposing areas of the glass having a sub-micron width to ultraviolet light to create refractive-index-modulated regions in the glass layer, thereby forming a sub-micron grating.

7. The tunable photonic channelizer of claim 6, wherein the fiber Bragg gratings are electrically tunable using the electro-optical constriction effect.

8. A method for optical tunable filtering, the method comprising the steps of:
   generating a first optical signal at an optical signal generator;
   receiving the first optical signal as a first input of an optical modulator;
   accepting radio frequency information;
   modulating the first optical signal at the optical modulator with the accepted radio frequency information to produce a second optical signal;
   filtering the second optical signal with a plurality of electrically tunable fiber Bragg gratings having bandwidths less than or equal to 10 MHz to produce a plurality of third optical signals;
   extracting with a plurality of detectors the radio frequency information in the plurality of third optical signals;
   measuring temperature and/or environmental changes at the optical filter;
   providing a feedback signal comprising information on the measured temperature and/or environmental changes from the optical filter to the optical signal generator; and
   floating the first optical signal in relation to the feedback signal.

9. The method of claim 8, further comprising the step of sweeping the optical filter with voltage to selectively tune the fiber Bragg gratings.

10. The method of claim 8, further comprising the step of isolating the optical signal generator and the optical modulator such that the first optical signal travels only from the optical signal generator to the optical modulator.

11. The method of claim 8, wherein the step of accepting radio frequency information comprises accepting the radio frequency information from an antenna.

12. The method claim 8, further comprising the step of transmitting the second optical signal with an optical light guide from the optical signal modulator to the fiber Bragg gratings.

13. The method of claim 8, wherein the step of filtering the second optical signal is performed using fiber Bragg gratings formed by the process of:
   depositing a layer of amorphous glass having a refractive index in the range of 1.4-1.8 and a thickness of 0.1-0.3 micrometer atop a $LiNbO_3$ wafer; and
   selectively exposing areas of the glass having a sub-micron width to ultraviolet light to create refractive-index-modulated regions in the glass layer.

14. The method of claim 8, wherein the fiber Bragg gratings are electrically tunable using the electro-optical constriction effect.

* * * * *